United States Patent [19]

Fink

[11] Patent Number: 5,287,368
[45] Date of Patent: Feb. 15, 1994

[54] HIGH RESOLUTION SPECTRAL LINE SELECTOR

[75] Inventor: David Fink, Los Angeles, Calif.

[73] Assignee: Hughes Aircraft Company, Los Angeles, Calif.

[21] Appl. No.: 871,878

[22] Filed: Apr. 21, 1992

[51] Int. Cl.⁵ .................................................. H01S 3/13
[52] U.S. Cl. ........................................ 372/32; 372/103
[58] Field of Search .................... 372/32, 19, 102, 103

[56] References Cited

U.S. PATENT DOCUMENTS

| | | | |
|---|---|---|---|
| 4,016,504 | 4/1977 | Klauminzer | 372/102 |
| 4,233,571 | 11/1980 | Wang et al. | 372/98 |
| 4,573,157 | 2/1986 | O'Meara | 372/19 |
| 4,656,641 | 4/1987 | Seifres et al. | 372/103 |
| 4,803,694 | 2/1989 | Lee et al. | 372/103 |
| 5,065,407 | 11/1991 | Pax | 372/103 |

*Primary Examiner*—Rodney B. Bovernick
*Assistant Examiner*—Robert E. Wise
*Attorney, Agent, or Firm*—William J. Streeter; Wanda Denson-Low

[57] ABSTRACT

A spectral line selector for a laser comprises a diffraction grating that images a waveguide exit plane back into the waveguide with an essentially exact reproduction of the waveguide output intensity and phase distribution and with a predetermined wavelength. The selector also comprises lenses disposed between the waveguide exit at a point between the exit opening and the grating, the lenses providing a magnification and a phase compensation to the beam passing therethrough such that the phase of the beam returned to the waveguide matches that of the exiting beam. Thus, coupling losses due to clipping of the returned beam at the entrance to the waveguide bore and coupling losses due to a mismatch of the returning field phase to that of the waveguide mode are made essentially zero.

13 Claims, 2 Drawing Sheets

HIGH RESOLUTION SPECTRAL LINE SELECTOR

BACKGROUND OF THE INVENTION

This invention relates generally to lasers and, more particularly, to a high resolution spectral line selector for a waveguide laser that in operation introduces no coupling losses to a beam of laser radiation that exits a waveguide, propagates to a differaction grating, and is selectively reflected back into the waveguide.

A particular problem encountered in the design of lasers and, in particular, waveguide lasers is the energy loss associated with the coupling of the laser beam from an end of the laser waveguide to a mirror and back into the waveguide. This energy loss problem is also encountered when it is desired to select a particular spectral line for the laser radiation, as with a diffractive grating. Such energy losses are caused both by clipping of the optical field at the exit/entrance to the waveguide and by any mismatch between the amplitude and phase distribution of the returning field and that of the waveguide mode. If such a mismatch condition is present, the waveguide will act as a filter and attenuate the propagating field until the field matches the waveguide mode. This attenuation of the field results in an energy loss, which further results in a reduction in laser output power.

The amount of coupling loss as a function of mirror position for curved end mirrors with a waveguide laser having a circular bore was first characterized by R. L. Abrams in 1972 (IEEE J. Quant. Elect. OE-8, 838, Nov. 1972). Since 1972, square bore waveguide lasers have become more widely utilized but, in general, the design of the coupling optics has remained essentially the same.

FIG. 1 is adapted from the above mentioned journal article (p. 841) and shows the minimum possible coupling loss for an optimally curved single end mirror placed at a distance Z from the end of a circular bore waveguide. The parameter b is equal to 0.325 $D^2/\lambda$, where D is the diameter of the waveguide bore and $\lambda$ is the waveguide of the radiation that comprises the laser beam.

As an example, for a waveguide laser having a 2 mm diameter bore where $\lambda = 10.6$ $\mu$m, b will equal 12.3 cm. It can be seen by reference to FIG. 1 that in order to achieve a coupling loss below 0.5% that the mirror must be closer than 0.37 mm or farther than 250 cm from the end of the bore. If 1.5% losses are acceptable, the mirror must be closer than 1.2 cm or farther than 120 cm or exactly at 12.3 cm. The additional 2% of round trip loss experienced by the laser beam (1.5% versus 0.5% at each end of the laser) may result in as much as a 40% reduction in a typical waveguide laser's output power. As may be appreciated, the physical construction of a particular waveguide laser or other factors, such as possible damage to the optics by the cavity plasma, may prohibit the placement of coupling optics at an optimal position, such as adjacent to the end of the bore. Thus, the coupling losses experienced by the laser may be prohibitively high. Also, waveguide lasers constructed with known coupling methods must rely entirely on waveguide losses to attain mode discrimination.

In addition to these coupling losses, for those lasers that employ a diffraction grating positioned relative to an exit of the waveguide in order to provide for spectral line selection, an additional energy loss due to the grating inefficiency is also experienced. Also, such laser/grating systems of the prior art provide only a slight alignment advantage for the desired spectral line, resulting in such systems often "hopping" to other spectral lines where the laser system may operate in other than the fundamental mode.

SUMMARY OF THE INVENTION

The foregoing problems are overcome and other advantages are provided by a laser spectral line selector, constructed in accordance with the invention, that utilizes spherical optics to couple a laser beam out of the laser waveguide, a diffraction grating to provide a wavelength dispersion, and an aperture to block all wavelengths except those corresponding to the desired spectral line.

In an illustrative embodiment, the selector of the present invention comprises a diffraction grating and associated optics that image a waveguide laser's exit plane back into the waveguide with an essentially exact reproduction of the waveguide output intensity and phase distribution and with a wavelength confined to a desired spectral line.

The selector optics comprise an imaging lens and a phase compensating lens disposed between the waveguide exit opening and the grating, the lenses providing a magnification and a phase compensation to the beam passing therethrough such that the intensity and phase of the beam returned to the waveguide matches that of the exiting beam. Thus, coupling losses due to clipping of the returned beam at the entrance to the waveguide bore and coupling losses due to a mismatch of the returning field phase to that of the waveguide mode are made essentially zero. An aperture is also provided between the lenses for blocking all wavelengths except the desired wavelength from reentering the waveguide laser cavity, thus causing the laser to operate at a desired wavelength.

The use of the invention also provides for laser mode discrimination by reducing the size of the aperture in order to clip some amount of energy from the reconstructed image.

BRIEF DESCRIPTION OF THE DRAWINGS

The foregoing aspects and other features of the invention are explained in the following description, taken in conjunction with the accompanying drawings wherein.

DETAILED DESCRIPTION OF THE INVENTION

This Application is related to my copending Application entitled "Zero Loss Waveguide Coupler" Ser. No. 871,886 also assigned to the assignee of the present Application and filed on even date herewith now U.S. Pat. No. 5,212,747.

The present invention advantageously makes use of the fact that the energy radiated from an exit of a waveguide laser does not propagate in all directions, but is confined to a small angle about the nominal direction of propagation of the radiation. Therefore a relatively small lens (or curved mirror) may be used to capture substantially all of the radiated energy to thereby form an image of the waveguide exit plane, wherein the lens, waveguide exit, and image locations are related by the usual, well known, geometric optics lens equation. For example, in a 2 mm bore waveguide operating at a wavelength of 10.6 $\mu$m, substantially all of the energy is contained within an f/10 cone.

If substantially all of the radiated energy is captured by a lens or mirror and used to form the image, the image field distribution will be essentially an exact scaled replica of the object field distribution (with no diffraction effects), with the exception of the addition of a spherical phase curvature. The scaling magnification (M) is equal to the ratio of the image distance to the object distance, and the additional spherical phase curvature has a divergent radius of curvature of $-Mf$, where M is the aforementioned scaling magnification, f is the focal length of the lens or mirror, and the negative sign indicates divergent.

It is convenient to measure the phase curvature by the reciprocal of the divergent radius so that the result of successively applied phase curvatures can be found by algebraic addition. Phase curvature is proportional to the phase deviation of the field from flat. The result of the imaging described above, then, is to scale the field and apply a divergent phase curvature of $-1/(Mf)$.

By selecting both the image and the object distances to be the same, the image field is made to match the field at the waveguide exit except for a phase curvature of $-1/f$. If one-half of this curvature is compensated for at the waveguide exit by the use of a compensating lens that impresses a phase curvature of $+1/(2f)$ upon the beam, and the remaining one-half of the curvature is compensated for by a similar lens at the image plane, the final phase distribution will have no added phase curvature and will substantially match that of the original phase distribution at the waveguide exit.

Figure 1:
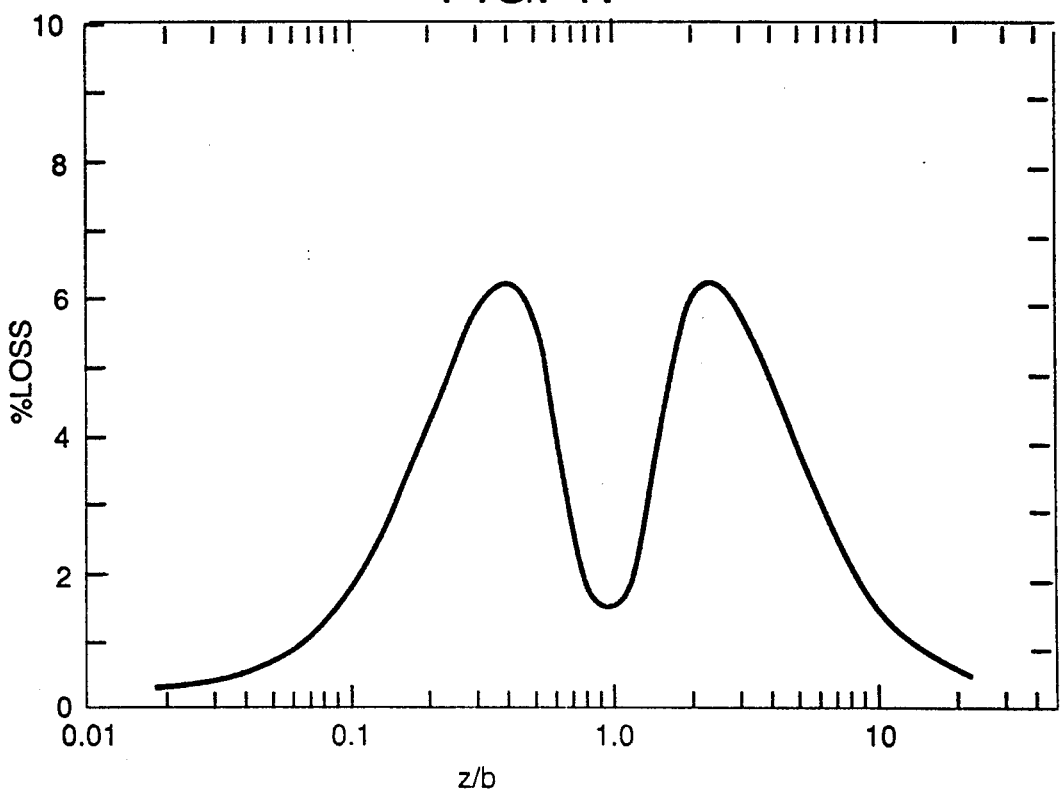
FIG. 1 is a graph adapted from the prior art showing the coupling loss of a waveguide laser (expressed as per cent) along the ordinate and a value related to the position of end reflector mirrors along the abscissa for an optimally curved mirror at each position.
Figure 2:
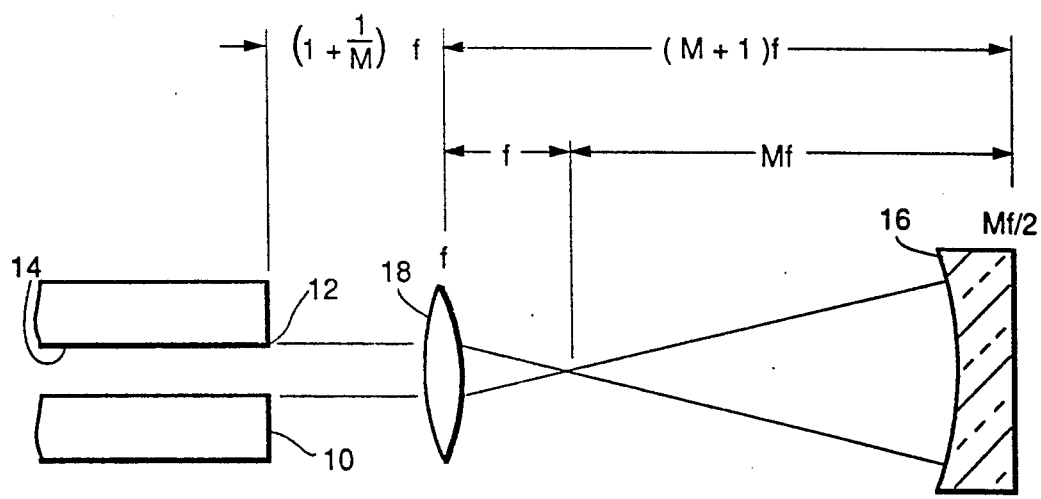
FIG. 2 is a schematic representation of an essentially zero-loss end reflector which is useful in understanding the operation of the present invention.

An end-reflector embodiment of such a zero-loss coupler is shown in FIG. 2. A laser waveguide 10 has an exit 12 of a bore 14, which may have a circular or square or other centro-symmetric cross-sectional shape. A curved mirror 16 images the exit 12 back into the waveguide bore, the image being a substantially exact reproduction of the intensity distribution of the exit radiation. An imaging lens 18 provides a magnification to the radiation which, in conjunction with the curvature of mirror 16, ensures that the phase of the reflected radiation also matches that originally present at the waveguide exit 12. Such as system may be considered to be a substantially perfect imager with no diffractive effects, and therefore couples substantially perfectly back into the waveguide mode.

As can be seen more specifically in FIG. 2, imaging lens 18 has a focal length of f and a magnification factor of M associated therewith, and is positioned at a distance of $(1+1/M)f$ from the exit 12 of cavity 14.

Mirror 16 has a curvature that is selected to provide a converging phase curvature of $2/Mf$, which compensates for the diverging phase curvature added to the final image by the two passes through lens 18. Mirror 16 has, due to the selected curvature, a resulting focal length of $Mf/2$.

The principles of the essentially zero-loss coupler described above may be advantageously employed, in accordance with the present invention, to provide a high resolution, low-loss, spectral line selector for a laser.

Figure 3:
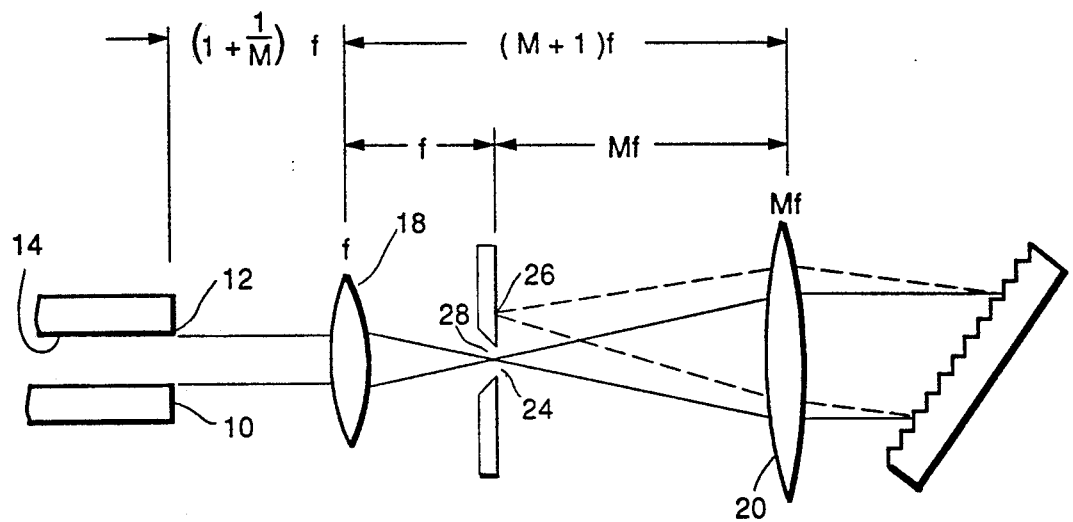
FIG. 3 is a schematic representation of a waveguide laser spectral line selector which is one embodiment of the invention.

Referring now to FIG. 3, there is shown one embodiment of the invention wherein it can be seen that the curved mirror 16 of FIG. 2 has been replaced with a phase compensating lens 20 and a diffraction grating 22. Imaging lens 18 provides a magnification to the beam as before, the magnified intermediate image now being formed upon grating 22. Grating 22 provides a fixed angular dispersion independent of how large the intermediate image on the grating 22 is made. Increasing the distance between the grating 22 and the common focal point of lenses 18 and 20 provides for a larger transverse displacement between a focussed spot 24 of the desired wavelength and a focussed spot 26 of an undesired, rejected wavelength. Equivalently, increasing the distanced can be considered as effectively increasing the angular resolution of grating 22 while maintaining the angular dispersion constant.

For example, a two millimeter diameter grating at 10.6 microns has an angular resolution of approximately five mrad. The dispersion between adjacent $CO_2$ transition lines is also approximately five mrad, it being realized that $CO_2$ may be utilized as the active lasant gas medium within cavity 14. If lens 18 has an associated magnification factor of 10, the effective resolution of grating 22 will be 0.5 mrad. An aperture 28 provided around the desired focussed spot 24 is utilized to block all wavelengths except the desired wavelength in order to obtain wavelength discrimination without introducing a loss to the energy of the desired spectral line. Hence, the only energy loss associated with a spectral line selector constructed in accordance with the invention is the loss due to the grating 22 inefficiency.

It should be noted that as the effective grating resolution is increased, the diameters of the focussed spots 24 and 26 remain constant, in that the distance to the grating is increased proportionately. This is due to the effective grating resolution being a function of M and, in addition, the distance (Mf) of lens 20 from the focal point of lens 18 also being a function of M. However, the transverse separation of spots 25 and 26 will increase since the angular dispersion of grating 22 remains constant, thereby facilitating the operation of aperture 28.

It is noted that a transmissive diffraction grating in combination with a mirror, or a prism in combination with a mirror, would functionally be equivalent to the reflective diffraction grating 22. Therefore, whenever "grating" is used in this specification and claims, it shall be construed to include in its definition these other two structures.

Figure 4:
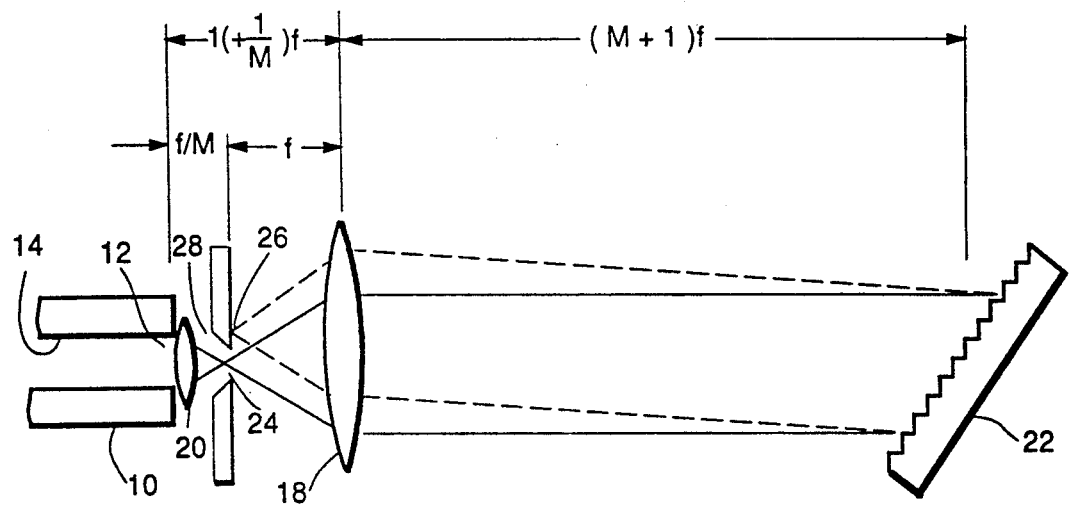
FIG. 4 is a schematic representation of a waveguide laser spectral line selector which is constructed in accordance with another embodiment of the invention.

Referring now to FIG. 4 there is shown another embodiment of the present invention wherein the positions of the imaging lens 18 and the phase compensating lens 20 have been reversed. As can be seen, the aperture 28 is positioned, as in FIG. 3, at the focal point of lens 18 in order to pass the focussed spot 24 of the desired wavelength while blocking the focussed spot 26 of undesired wavelengths. The compensating lens 20 is positioned adjacent to exit 12 and need only be large enough to accommodate the ray cone as it exits the cavity 14. Hence, lens 20 may be made physically smaller than in the embodiment shown in FIG. 3.

As can be appreciated, in other, unillustrated, embodiments of the invention, grating 22 may have a curvature selected to provide the required amount of convergent phase curvature to the beam, thereby compensating directly for the divergent phase curvature introduced by imaging lens 18. If such a curved diffraction grating is employed, compensating lens 20 may not be required. Of course, in some systems it may be desirable to allocate the compensating phase curvature in some proportion between such a curved grating and a compensating lens, each thereby applying a compensating phase curvature which, when summed together, compensates for the divergent, imaging lens induced, phase curvature.

It should be realized that a laser system having an embodiment of the present invention can never lase on any but the desired spectral line, even if the cavity modes of the laser were tuned to prevent oscillation on the grating selected line.

The use of the invention is also advantageous when it is desired to provide for laser mode discrimination. As has been mentioned, prior art lasers generally rely totally on waveguide losses to achieve mode discrimination, a method that suffers at least from the disadvantage of a lack of control and predictability. The present invention, however, overcomes such disadvantages in providing mode discrimination by reducing the size of the aperture 28. Such a reduction in aperture 28 size introduces an energy loss into the overall system due to some portion of the energy being clipped from the fundamental mode, which results in the image at the entrance to the cavity 14 not exactly matching the waveguide mode distribution. However, for a given application some practical tradeoff between system loss and mode discrimination may be determined that results in the energy loss not being detrimental to overall system performance.

If the size of aperture 28 is reduced for mode discrimination purposes, then the magnification required for wavelength discrimination may also be reduced. Such a reduction in magnification may further result in grating 22 being placed nearer to aperture 28, it being remembered that the grating 22 is positioned at a distance if Mf from aperture 28. A reduction in overall system size and packaging requirements may thereby be obtained.

It should be realized that the use of the invention is not limited to use only with waveguide lasers but, instead, may be employed in non-waveguide laser applications. Similarly, the use of the invention may also be advantageously employed in non-laser optical systems wherein it is desired to provide radiation having a given wavelength without incurring a significant degree of coupling losses.

It is to be understood, therefore, that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method for inducing a laser to lase on a desired spectral line, the method comprising the steps of:
   imaging a radiation beam that exits an end of a laser waveguide to provide a magnification to the beam, the exiting beam having energy phase and amplitude characteristics, the imaging also impressing a first phase curvature upon the image;
   phase compensating said image by impressing a second phase curvature upon it, the second phase curvature being selected to be substantially equal to and opposite from the first phase curvature;
   reflecting the magnified, phase compensated beam from a spectral line selection device, the device reflecting a beam of the desired spectral line and beams of undesired spectral lines each with a different angle of reflection;
   pre-compensating the reflected beam of the desired spectral line by impressing said second phase curvature upon it;
   passing the reflected beam of the desired spectral line through an aperture disposed relative to the end of the laser waveguide and to the device such that only the reflected beam of the desired spectral line passes through the aperture;
   imaging said reflected beam of the desired spectral line back into the end of the laser waveguide;
   the reentering spectral line energy having phase and amplitude characteristics substantially equal to the characteristics of the exiting beam energy whereby the laser is caused to lase at the desired spectral line.

2. The method of claim 1 wherein the spectral line selection device is a diffraction grating and wherein the step of imaging provides a magnified image of the end of the laser waveguide upon the diffraction grating whereby the angular resolution of the grating is effectively increased by an amount proportional to the amount of magnification.

3. The method of claim 2 wherein the diffraction grating is provided with a curvature suitable for phase compensating the beam whereby both steps of phase compensating and the step of reflecting are performed simultaneously by the diffraction grating.

4. The method of claim 1 further comprising the step of:
   reducing the size of the aperture to introduce an energy loss to the reentering spectral line energy whereby laser mode discrimination is provided.

5. The method of claim 1 wherein the first imaging step is performed subsequent to the first phase compensating step.

6. A spectral line selector for a laser comprising:
   means for imaging a beam of radiation exiting an end of a laser waveguide, said means for imaging having a focal length f and a magnification factor M associated therewith, said means for imaging introducing a first phase curvature upon the image;
   means for phase compensating said image, said means for phase compensating being operable for introducing a second phase curvature upon said beam, the second phase curvature having an equal and opposite magnitude to the first phase curvature;
   means for selectively reflecting the phase compensated beam such that a beam of the desired spectral line is reflected back through said phase compensating and imaging means towards the end of said laser waveguide; and
   means for blocking reflected spectral lines other than the desired spectral line such that only the beam of the desired spectral line reenters said waveguide with a phase and amplitude energy distribution substantially equal to that of the exiting beam whereby the laser is caused to lase at the desired spectral line.

7. The selector of claim 6 wherein said means for imaging and said means for phase compensating are each a lens.

8. The selector of claim 6 wherein said means for selectively reflecting is a diffraction grating.

9. The selector of claim 8 wherein the angular resolution of said grating is effectively increased by an amount proportional to M.

10. The selector of claim 9 wherein said imaging lens is disposed at a distance of $(1+1/M)f$ from the end of said waveguide, said blocking means is disposed at a distance of f from said imaging lens, and said compensating lens is disposed at a distance of Mf from said aperture means.

11. The selector of claim 9 wherein said compensating lens is disposed adjacent to the end of said waveguide, said blocking means is disposed at a distance of f/M from said compensating lens, said imaging lens is disposed at a distance of f from said aperture means, and said grating is disposed at a distance of $(M+1)f$ from said imaging lens.

12. The selector of claim 6 wherein said means for blocking is an aperture positioned to allow only the desired spectral line to pass therethrough and re-enter said waveguide.

13. The selector of claim 12 wherein said aperture means has an opening size selected to introduce an energy loss into the reflected spectral line passing therethrough for providing the laser with mode discrimination.

* * * * *